UNITED STATES PATENT OFFICE.

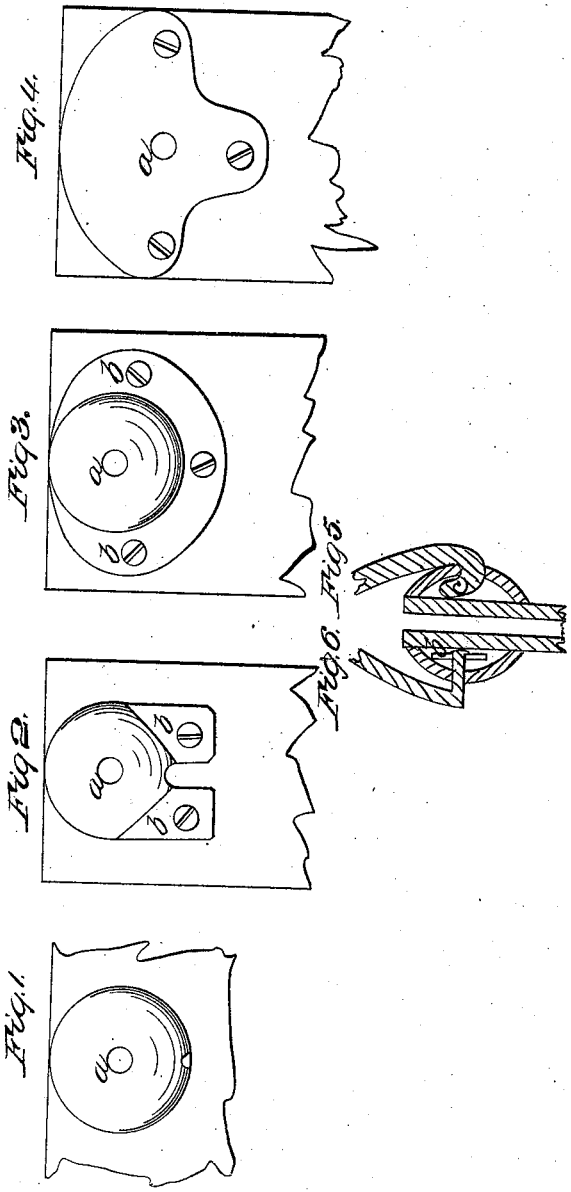

JOHN F. PHELPS, OF HAVANA, NEW YORK.

IMPROVEMENT IN THE MODE OF MAKING AND AFFIXING THE EARS AND BAILS OF PAILS, BUCKETS, &c.

Specification forming part of Letters Patent No. 1,605, dated May 12, 1840.

*To all whom it may concern:*

Be it known that I, JOHN F. PHELPS, of Havana, in the county of Chemung and State of New York, have invented an Improved Mode of Making and Affixing the Ears and Bails or Handles of Pails, Kettles, Buckets, or other Vessels, whether formed of wood or of metal; and I do hereby declare that the following is a full and exact description thereof.

In the ordinary method of affixing the ears and handles or bails of buckets or other vessels, the ears are made to project above the rims of said buckets or other vessels, and the wires or round rods of which the bails are formed are usually made to hook into said ears with their ends turned outward. In my improved mode of constructing them the ears are placed entirely below the rim of the vessel, and the cords of the bails are hooked or turned inward, and are received and turn round within a concavity formed in the ear or in the vessel for that purpose. These ears may be riveted, screwed, or soldered to the vessel, according to circumstances. They may also be varied in form, as will be seen by the examples represented in the accompanying drawings.

Figure 1 represents one of the ears, consisting simply of a concavo-convex or cup-like piece of metal with a hole, *a*, in the center of it for the bail to pass through, the concave side of which piece of metal is to be attached by soldering its edges to the pail, bucket, kettle, or other vessel of tin, brass, or other metal.

In Figs. 2 and 3 there are rims or plates *b b* appended to the cup-like part, by which the ears may be attached to the vessels by the aid of rivets or screws.

In buckets made of wood the concavity in the plate or ear for the reception of the hook may be omitted, and a flat plate such as is represented in Fig. 4, furnished with a hole, *a*, for the reception of the bail, may be attached thereto, an excavation being first made in the wood for the reception of the hook.

Fig. 5 is a sectional view of one of the ears with the hook *c* of the bail within its concavity. Instead of being hooked, the bail may be bent at right angles, and a round plate or button riveted on its end, as shown at *b*, Fig. 6. In affixing these ears and bails, the ends of the latter, being first properly bent, are passed through the holes prepared for them in the former, which are then to be riveted or soldered in place. In all cases the ears should be as near as possible to the edge or rim of the bucket or other vessel to which they are attached.

What I claim as my invention, and desire to secure by Letters Patent, is—

The so constructing and affixing the ears and bails of buckets or other vessels, of wood or of metal, as that the hooks of the bails bent inward shall be received and turn within a cavity prepared to receive them on the under sides of the ears, as herein described, the latter being attached so as to stand below the rims of the vessels to which they are affixed. I do not claim the mere turning of the hooks inward, this having been before done; but I claim only the combination of the hooks and ears, as above set forth.

JOHN F. PHELPS.

Witnesses:
PETER TRACY,
A. S. DURKEE.